(12) United States Patent
Previti et al.

(10) Patent No.: US 11,894,990 B2
(45) Date of Patent: Feb. 6, 2024

(54) DETERMINING CONFLICTS BETWEEN KPI TARGETS IN A COMMUNICATIONS NETWORK

(71) Applicant: Telefonaktiebolaget LM Ericsson (publ), Stockholm (SE)

(72) Inventors: Alessandro Previti, Stockholm (SE); Kristijonas Cyras, San Jose, CA (US); Yifei Jin, Solna (SE); Pedro Batista, Sollentuna (SE); Aneta Vulgarakis Feljan, Stockholm (SE); Marin Orlic, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/026,920

(22) PCT Filed: Sep. 30, 2020

(86) PCT No.: PCT/EP2020/077423
§ 371 (c)(1),
(2) Date: Mar. 17, 2023

(87) PCT Pub. No.: WO2022/069036
PCT Pub. Date: Apr. 7, 2022

(65) Prior Publication Data
US 2023/0327961 A1    Oct. 12, 2023

(51) Int. Cl.
*G06F 11/34* (2006.01)
*G06F 9/455* (2018.01)
(Continued)

(52) U.S. Cl.
CPC ........ *H04L 41/5003* (2013.01); *H04L 41/145* (2013.01); *H04L 41/16* (2013.01); *H04W 24/02* (2013.01); *H04W 24/08* (2013.01)

(58) Field of Classification Search
CPC ... H04L 41/5003; H04L 41/145; H04L 41/16; H04W 24/02; H04W 24/08
(Continued)

(56) References Cited

U.S. PATENT DOCUMENTS

| 10,540,898 B2* | 1/2020 | Kim ................... G08G 5/0026 |
| 2006/0221387 A1* | 10/2006 | Swift .................... G06Q 10/06 |
| | | 358/1.15 |

(Continued)

FOREIGN PATENT DOCUMENTS

| WO | 2016026509 A1 | 2/2016 |
| WO | 2020108768 A1 | 6/2020 |

OTHER PUBLICATIONS

International Search Report and Written Opinion of the International Searching Authority for PCT International Application No. PCT/EP2020/077423 dated May 27, 2021.

(Continued)

*Primary Examiner* — Jude Jean Gilles
(74) *Attorney, Agent, or Firm* — Sage Patent Group

(57) ABSTRACT

A computer implemented method performed by a node in a communications network comprises obtaining Key Performance Indicator, KPI, targets for a plurality of KPIs, in the communications network, and determining relationships between the KPIs using a model trained using a graph-based machine learning process. Each relationship describes a manner in which changing a network configuration to alter a first one of the plurality of KPIs affects a second one of the plurality of KPIs. The method then comprises determining one or more conflicts between the KPI targets, using the relationships.

20 Claims, 6 Drawing Sheets

(51) Int. Cl.
*H04L 41/5003* (2022.01)
*H04L 41/14* (2022.01)
*H04W 24/08* (2009.01)
*H04W 24/02* (2009.01)
*H04L 41/16* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2012/0046999 | A1* | 2/2012 | Jayaraman | G06Q 10/06393 |
| | | | | 705/7.39 |
| 2014/0129297 | A1* | 5/2014 | Iwama | G06Q 10/06393 |
| | | | | 705/7.39 |
| 2015/0281709 | A1* | 10/2015 | Bracha | H04N 19/65 |
| | | | | 375/240.26 |
| 2020/0252310 | A1 | 8/2020 | Thampy et al. | |
| 2020/0371999 | A1* | 11/2020 | Notani | H04L 67/02 |

OTHER PUBLICATIONS

Singer et al., "Node Embedding over Temporal Graphs," arXiv:1903.08889v2 [cs.LG] Apr. 2, 2019, 11 pages.
Wikipedia, "One-hot," https://en.wikipedia.org/w/index.php?title=One-hot&oldid=1127084325, last edited on Dec. 12, 2022, 3 pages.
Wikipedia, "Activation function," https://en.wikipedia.org/w/index.php?title=Activation_function&oldid=1141617854, last edited on Feb. 25, 2023, 5 pages.
Phi Vu Tran, "Learning to Make Predictions on Graphs with Autoencoders," arXiv:1802.08352v2 [cs.LG] Jul. 29, 2018, 9 pages.
Raymond Reiter, "A Theory of Diagnosis from First Principles," Artificial Intelligence, vol. 32, Issue 1 (1987), pp. 57-95.
Belov et al., "Towards Efficient MUS Extraction," AI Communications, 25 (2012), 19 pages.
Marques-Silva et al., "On Computing Minimal Correction Subsets," Proceedings of the Twenty-Third International Joint Conference on Artificial Intelligence (2013), pp. 615-622.

* cited by examiner

DETERMINING CONFLICTS BETWEEN KPI TARGETS IN A COMMUNICATIONS NETWORK

CROSS-REFERENCE TO RELATED APPLICATION

This application is a 35 U.S.C. § 371 national stage application of PCT International Application No. PCT/EP2020/077423 filed Sep. 30, 2020, the contents of which are hereby incorporated by reference herein.

TECHNICAL FIELD

This disclosure relates to methods, nodes and systems in a communications network. More particularly but non-exclusively, the disclosure relates to determining (and resolving) conflicts between Key Performance Indicator (KPI) targets in a communications network.

BACKGROUND

Network management is evolving towards zero-touch management (e.g. minimal to no human intervention) and the interfaces for such network management are evolving to be increasingly human-friendly. In such interfaces, the network manager expresses what they want from the communications network in terms of business intents (BIs), which may be defined as "declarations of high-level business and operational goals or states that a system should meet and maintain". Such BIs are defined without specifying how the network should achieve the BI (e.g., without prescribing events, conditions or actions).

For a network to fulfil a BI, the network must first translate it, usually by mapping it to policies and KPI targets. Those policies are executed and KPIs monitored to report back on intent fulfilment. A network has to fulfil multiple intents and define polices that consider all the BIs that are set. Modelling the impact that one BI has on another is therefore a complex task. Therefore, current solutions use loose constraints between BIs and treat their policies and KPI targets independently.

It is an object herein to improve the manner in which KPI targets (as derived from BIs) are applied to a communications network.

SUMMARY

As noted above, Business Intents (BIs) set by a human operator are translated into KPI targets by the network. BIs often map to different sets of KPI targets. Meeting BIs entails satisfying (all) sets of KPI targets as best as possible. A problem arises when BIs are mutually incompatible because their respective KPI targets cannot be mutually satisfied. This problem is especially pressing since the relationships among KPIs are often difficult to compute, given the large number of KPIs and their dependence on numerous (sometimes uncontrollable) parameters.

Some simple examples of conflicting and co-operating BIs are:

Conflicting KPIs—assume a static set of base stations and consider the following BIs: BI1 Increase coverage; BI2 Increase throughput. Meeting BI1 will likely add more users to the system, which in turn will decrease the available throughput to individual users. In addition, meeting BI1 will also increase interference which is bad for meeting BI2.

Cooperating KPIs—BI1 save energy; BI2 reduce OPEX (operational expenditure). Improving BI1 will also improve BI2, since energy is an OPEX cost.

Strategies that try to model all the impacts that a BI can cause on other BIs are currently too complex to maintain in practice and current solutions therefore use loose constraints between BIs and treat their policies and KPIs independently. This causes some BIs to interfere with each other and have unforeseen impacts on KPIs. It is thus an object of embodiments herein to improve on such problems.

Thus according to a first aspect there is a computer implemented method performed by a node in a communications network. The method comprises obtaining Key Performance Indicator, KPI, targets for a plurality of KPIs in the communications network, and determining relationships between the KPIs using a model trained using a graph-based machine learning process. Each relationship describes a manner in which changing a network configuration to alter a first one of the plurality of KPIs affects a second one of the plurality of KPIs. The method then comprises determining one or more conflicts between the KPI targets, using the relationships.

According to a second aspect there is a node in a communications network. The node comprises a memory comprising instruction data representing a set of instructions, and a processor configured to communicate with the memory and to execute the set of instructions. The set of instructions, when executed by the processor, cause the processor to obtain Key Performance Indicator, KPI, targets for a plurality of KPIs, in the communications network, and determine relationships between the KPIs using a model trained using a graph-based machine learning process. Each relationship describes a manner in which changing a network configuration to alter a first one of the KPIs affects a second one of the KPIs. The processor is further caused to determine one or more conflicts between the KPI targets, using the relationships.

According to a third aspect there is a node in a communications network. The node comprises processing circuitry adapted to obtain Key Performance Indicator, KPI, targets for a plurality of KPIs, in the communications network, and determine relationships between the KPIs using a model trained using a graph-based machine learning process. Each relationship describes a manner in which changing a network configuration to alter a first one of the plurality of KPIs affects a second one of the plurality of KPIs. The processing circuitry is further adapted to determine one or more conflicts between the KPI targets, using the relationships.

According to a fourth aspect there is a computer program comprising instructions which, when executed on at least one processor, cause the at least one processor to carry out the method of the first aspect.

According to a fifth aspect there is a carrier containing a computer program according to the fourth aspect, wherein the carrier comprises one of an electronic signal, optical signal, radio signal or computer readable storage medium.

According to a sixth aspect there is a computer program product comprising non transitory computer readable media having stored thereon a computer program according to the fourth aspect.

The aforementioned aspects of the disclosure herein allow for automated identification (and thus resolution) of conflicts in KPI targets that may arise from the implementation of different BIs (for example through identification of replacement BIs with revised KPI targets). The methods and systems described herein may also facilitate increased awareness/transparency of the impact of one BI on another BI. This can facilitate handling of BIs with higher complexity (e.g. greater number of inter-related KPIs) with improved KPI target conflict handling by the system. Some embodiments described below improve the transparency of the result achieved by using interpretable symbolic Artificial Intelligence (AI) approaches, such as constraint programming.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

The disclosure herein relates to a communications network (also referred to herein as a network or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
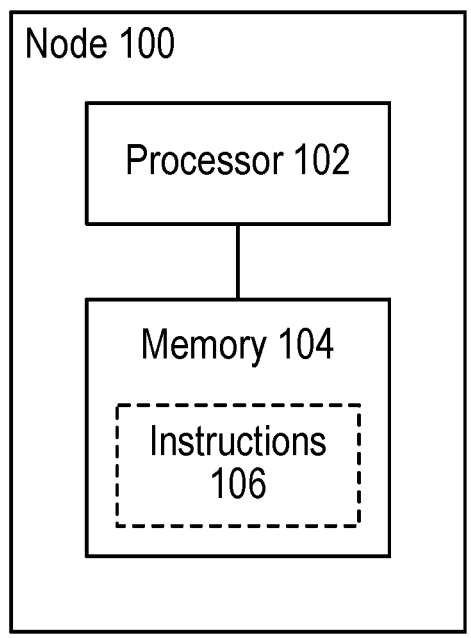
FIG. 1 shows a node according to some embodiments herein.

FIG. 1 illustrates a network node 100 in a communications network according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node 100 may comprise a processor (e.g. processing circuitry or logic) 102. The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions 106 that can be executed by the processor 102 of the node 100 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 is configured to obtain Key Performance Indicator, KPI, targets for a plurality of KPIs, in the communications network, determine relationships between the KPIs using a model trained using a graph-based machine learning process, wherein each relationship describes a manner in which changing a network configuration to alter a first one of the plurality of KPIs affects a second one of the plurality of KPIs. The node 100 is further configured to determine one or more conflicts between the KPI targets, using the relationships.

The use of graph-based techniques allows for a more complete and intuitive description of the known relationships among KPIs in the communications network and allows for the analysis and determination (e.g. prediction) of new relationships among KPIs, based on known relationships. Furthermore, the description relationship falls into a non-Euclidean space. According to recent research this can produce a leaner(lighter) model, compared to image or text-based models, and provides a better performance than models working in Euclidean spaces. Furthermore, graph-based methods allow for improved understanding of the relationships between KPIs by the human operators of the system, as said relationships may be represented in a more human-readable manner.

Figure 2:
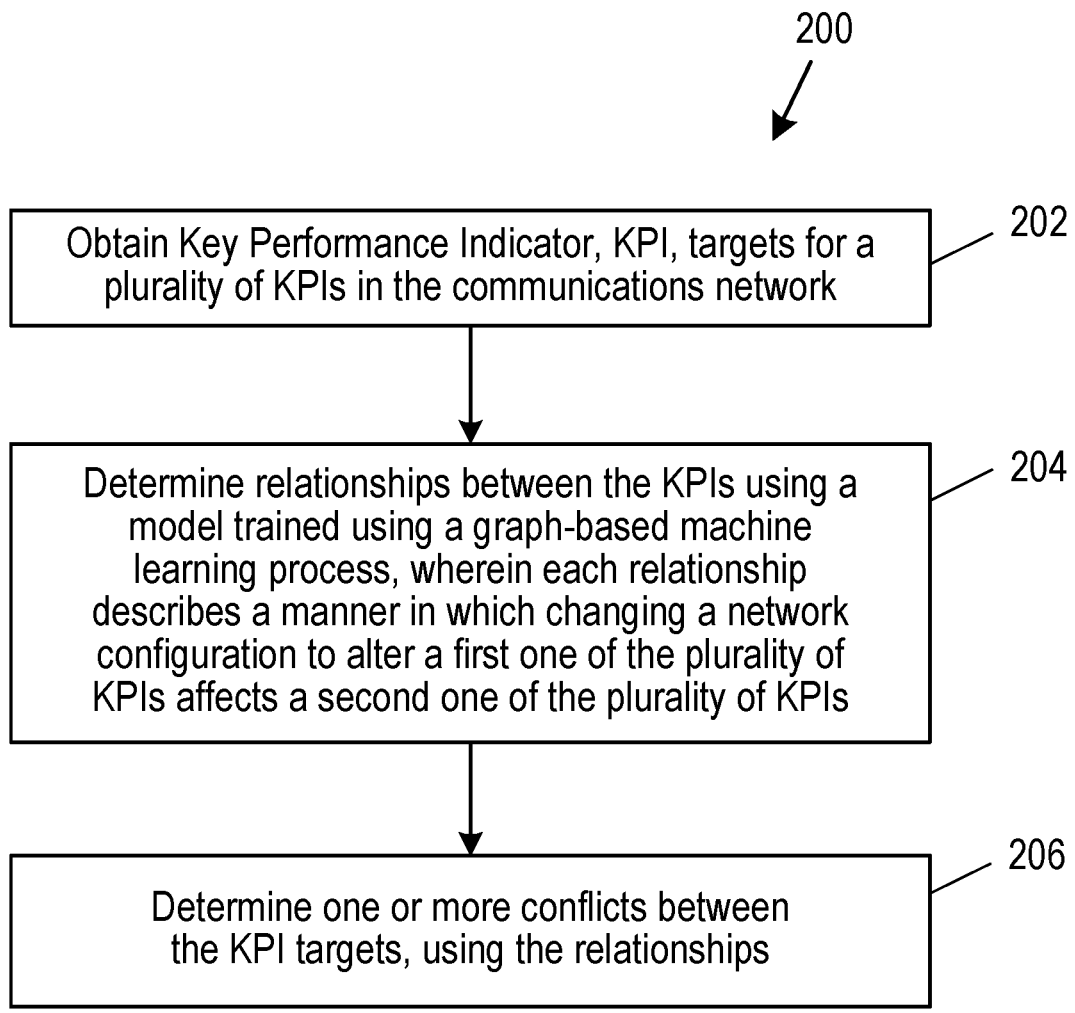
FIG. 2 shows a method according to some embodiments herein.

Turning to FIG. 2, there is a computer implemented method 200 according to some embodiments herein. The method 200 may be performed by a node in a communications network such as the node 100 described above.

Briefly, in a first step 202 the method comprises obtaining Key Performance Indicator, KPI, targets for a plurality of KPIs in the communications network. In a second step 204 the method comprises determining relationships between the KPIs using a model trained using a graph-based machine learning process, wherein each relationship describes a manner in which changing a network configuration to alter a first one of the plurality of KPIs affects a second one of the plurality of KPIs. In a third step 206 the method then comprises determining one or more conflicts between the KPI targets, using the relationships.

A KPI may be defined as any measurable metric in the communications network. Examples of KPIs include but are not limited to Latency, Throughput, and Average Queue Length.

In some embodiments, the step of obtaining 202 Key Performance Indicator, KPI, targets for a plurality of KPIs, in the communications network can comprise determining the KPI targets from one or more Business Intents, BIs. As noted above, BIs may be obtained (e.g. input) by a human user of the system. Each BI may then be converted or mapped into one or more KPI targets. A KPI target may be expressed in many forms. For example, a KPI target may be expressed in terms of a numerical target, e.g. "increase throughput to be greater than a threshold throughput"; in terms of a relative change, e.g. "Increase Coverage"; or with respect to another KPI, e.g. KPI1>2*KPI2. The skilled person will appreciate that these are examples however and that a KPI target may be expressed in any other quantifiable manner.

As an example, static mapping may be used to map BIs to KPIs. A static mapping comprises a set of rules linking each BI to one (or more) KPIs. Static mappings are typically created and maintained by experts. An example of a static mapping of one BI to two KPIs is:

BI: "Improve QoS".
Corresponding KPIs are:
  1. KPI1: Coverage (to be increased)
  2. KPI2: Congestion (to be decreased)

The service level agreement (SLA) insists that KPI2 has to be below a certain threshold T.

In step 204, as noted above, a model trained using a graph-based machine learning process is used to determine relationships between the KPIs. In this sense a relationship describes a manner in which changing a network configuration to alter a first one of the plurality of KPIs affects a second one of the plurality of KPIs. In other words, the relationship describes the impact that changing one KPI has on another KPI. A relationship may comprise an indication of whether changing the network configuration so as to increase the first one of the plurality of KPIs has the effect of increasing or decreasing the second one of the plurality of KPIs and/or a quantification of an amount by which changing the first one of the plurality of KPIs changes the second one of the plurality of KPIs. As noted above, the relationships between different KPIs can be highly complex with multiple interdependencies and the use of graph-based machine learning models and processes provides a manner in which to more accurately and intuitively model known relationships and predict new (e.g. previously unknown) relationships.

The skilled person will be familiar with graph-based machine learning processes and graph-based models whereby the data is structured in a graph of nodes (vertices) and edges that connect the vertices. An edge indicates a relationship and/or a type of relationship (e.g. directionality and strength of the relationship) between the data in the nodes. Datasets that can be represented in this manner include social media data whereby the nodes comprise users and the edges represent the relationship(s) between them.

Figure 3:
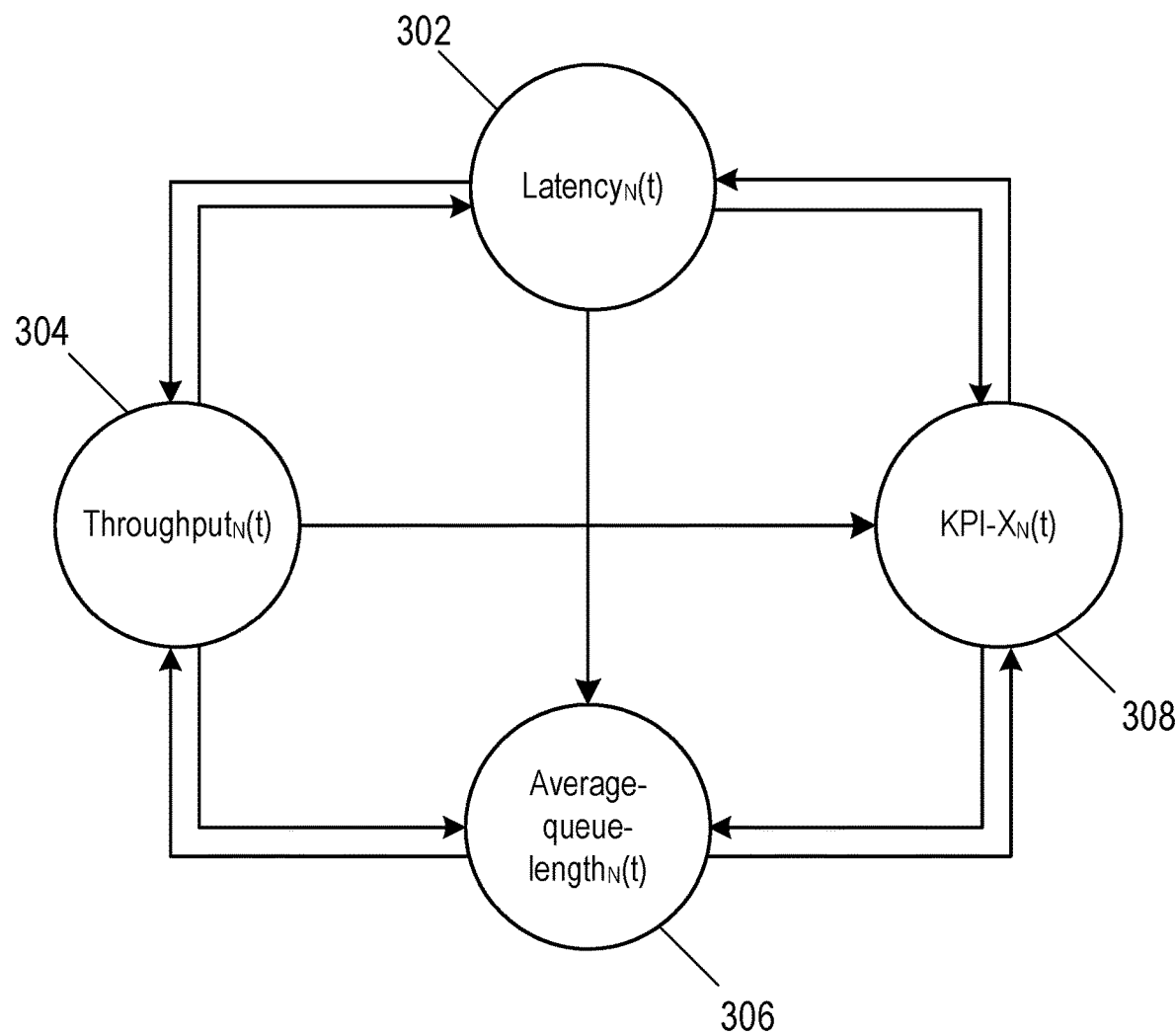
FIG. 3 illustrates an example graph representation of four example KPIs.

FIG. 3 shows a graph representation of four KPIs 302, 304, 306 and 308 in a communications network. In this representation, the KPI information is represented as a single-directional temporal graph. The vertices V (shown as circles in FIG. 3) each represent a temporal KPI index, and the directional edges E (shown as arrows in FIG. 3) represent the positive/negative effect that tuning one KPI has on another. Their values are related to a given network topology N at time t. This may be represented in a graph representation as $G(V_{N,t}, E_{N,t})$.

As noted above, BIs are linked with the action setting a target on a specific Network KPI. Yet, actions taken according to a BI, that aim for a change in a KPI, can benefit/degrade other KPIs. Graph-based representations are able to more accurately capture the complex inter-dependencies between the KPIs.

Mathematically, an empirical dataset of business intent KPI targets (TKPI) with timestamps t (the targeting vertices $\{V_{N,t,i}^{T}\}$), against other KPIs (OKPis) (other vertices $\{V_{N,t,j}^{O}\}$) is given, thus: $\{V_{N,t,i}^{T+}|V_{N,t,j}^{o+}, V_{N,t,k}^{o-} \ldots \}$ Here +, − denote the changing (value increase/decrease) of the KPI once a BI-related action is taken. Further, the edge connecting vertices with same changing (connecting $V_{N,t,i}^{T+}$ and $V_{N,t,j}^{o+}$) is noted as a positive edge ($E_{N,t(i,j)}^{+}$), where connecting different changing (connecting $V_{N,t,j}^{T+}$ and $V_{N,t,j}^{o-}$) is noted as a negative edge ($E_{N,t(i,j)}^{-}$).

Thus, a training data set for a graph-based machine learning model can be given according to:

$$\{V_{N,t,i}^{T+}|E_{N,t,(i,j)}^{+}, E_{N,t,(i,k)}^{-} \ldots \}$$

A linked prediction model may be applied to such a training data set (using machine learning) to automate the prediction on the positivity/negativity of the edges, and thus to predict the effect of tuning one KPI against other KPIs in the given network topology.

In other words, generally, step 204 may comprise obtaining a training dataset comprising example relationships between the KPIs, and training a model to predict other relationships between the KPIs, based on the obtained training dataset. In such examples, the KPIs are used as vertices and the example relationships between the KPIs are used as example edges in the graph-based machine learning process.

Relationships between KPIs in a communications network can be time-dependent. Thus in some embodiments, the training dataset further comprises temporal information and the relationships are time dependent (e.g. the temporal information may indicate a time period in which a relationship is valid or stable). In some embodiments therefore, the model may be trained to determine or predict relationships between the KPIs that apply during a particular time interval. A model suitable for such a purpose is a Directional Temporal Graph. Thus in some embodiments, the model may comprise a Directional Temporal Graph (or a Temporal Graph Node embedding). A Temporal Graph Node embedding is a variation of a Graph Neural Network (GNN).

Generally the step of determining 204 relationships between the KPIs (e.g. link prediction) may comprise adapting an End-to-End GNN, which comprises two steps: Node embedding and representation prediction.

Node embedding may generally be performed using any Node embedding network, for example, tNodeEmbed, as described in the paper: Singer, Uriel, Ido Guy, and Kira Radinsky. "*Node embedding over temporal graphs.*" arXiv preprint arXiv:1903.08889 (2019). Representation prediction can be performed using any recurrent neural network, for example, such as a network with a Long-Short term Memory (LSTM) architecture.

Generally, the model may be trained to predict new relationships between the KPIs, based on an obtained training dataset (as described above) by determining an embedding and an embedding function for the vertices in the training dataset, using the graph-based machine learning process (e.g. such as the "tNodeEmbed" method described above). Put another way, the graph-based machine learning process comprises a process of building node and/or vertex embeddings for a temporal graph. The relationships can then be determined based on weights associated with edges in the embedding and the embedding function (in other words the strength of the edges in the embedding and the embedding function). A detailed example of a method of determining an embedding and embedding function is provided in Phases 1 and 2 of the detailed example provided below.

As noted above, the embedding may be temporally dependent, e.g. the relationships or interdependencies between different KPIs may change overtime. It is therefore desirable to be able to determine, for a given time window, the most stable and/or the strongest relationships. This may be performed using an autoencoder (see also Phase 3 of the detailed example below).

The skilled person will be familiar with autoencoders, but in brief, autoencoders are a type of artificial neural network that are generally used to reduce complex data e.g. by ignoring signal noise. Autoencoders are used in an unsupervised manner. The autoencoder learns a compressed representation of the data thereby reducing its dimensionality, without losing the primary or main signal.

Thus, as used herein an autoencoder may be used to simplify, or reduce the dimensionality of a graph (e.g. an embedding or embedding function) as output from the graph-based machine learning processes described above, over a time window of interest. This is performed by reducing the dimensionality of the graph to the most prominent or stable (e.g. consistent) edges for the given time interval.

In more detail, if it is determined, through the node embedding process that a vertice V_i has a Positive/Negative impact on neighboring Vertices V_j, the question is then whether such a relationship holds/is valid throughout a time window of interest (e.g. a time window in which we wish to determine KPI target conflicts). If the relationship is not stable, the autoencoder model will not converge, making the training unsuccessful. Even if this relation with V_i and V_j holds in time window T, the relation of V_i and (its another neighbor) V_p not always holds, in time window T, will also lead to unconvergence of the model V_i→V_j. Thus, a successful training of an autoencoder means there exists a stable function expression of the KPI V_i taking its neighboring variables as inputs, in the selected time window T of interest.

Thus, the method may comprise using an autoencoder to determine a subset of edges from the embedding and the embedding function, wherein the subset of edges comprise edges connecting vertices' embedding can be mutually expressed by neighboring embeddings through a converged model, for longer than a threshold duration of time.

In some embodiments, where an autoencoder is used as described above, the method 200 comprises providing the output of the autoencoder and the embedding function to a second model. The method may then comprise training the second model, based on the determined embedding function and the output of the autoencoder, to take as input a time window and a change in a particular KPI (e.g. a KPI of interest), and output a prediction of the relationships between the particular KPI and other KPIs of the plurality of KPIs that are affected by the change in the particular KPI. The second model may thus be used to predict the relationships.

For example, the output of the autoencoder may be provided to a second model such as a Logistic Regression, LR, model or a Fully Connected Network, FCN.

Turning now to a particular embodiment that combines some of the elements described above, in one embodiment, the step of determining (204) relationships between the KPIs using a model trained using a graph-based machine learning process comprises four phases as follows.

Phase 1: Node Embedding
Input: Graph dataset $G(V_{N,t}, E_{N,t})$
Output: Set of Vertices' Embedding (in the form of a Matrix) $X^v \in \mathbb{R}^{T \times d}$ of Graph G, Where T denotes the number of time stamps, in each time stamps, the vertex is represented as a vector in dimension d. This can be expressed in one possible implementation as:

$$f_{t+1}(v) = \sigma(Af_t(v) + BR_tQ_tV)$$

Where: $A, B, R_t, Q_t$ will be learnt through training, $f_0(v) = \vec{0}$, v is a one-hot vector representing a vertex, $\sigma$ is the activation function.

Phase 2: Representation Prediction
Input: Vertices embedding $X^v \in \mathbb{R}^{T \times d}$
Output: vertices embedding function $f_T(v)$.
A vertices embedding function $f_T(v)$ is a feature vector that minimizes the loss of any given prediction task for each node v at time T (see paper entitled "*Node Embedding over Temporal Graphs*" by Singer, Guy and Radinsky (2019) for more information).
To produce the most fitting model towards the given data set, the parameter to be learnt in Phase 1 must produce the most for the task function $L_{Task}$, one possible setup of task function could be:

$$L_{Task} = -\sum_{v_i, v_j, v_k, v_l \in V} \log Pr\big((v_i, v_j) \in E^+_{N,t,(i,j)},$$

$$(v_k, v_l) \in E^-_{N,t,(i,j)}, |\text{sigmoid}(|f(v_i) - f(v_j)| - |f(v_k) - f(v_k)|)\big)$$

This is an example formulation of $L_{Task}$, however. For example, the sigmoid abs: sigmoid($|f(v_i)-f(v_j)|-|f(v_k)-f(v_k)|$) may be replaced by other operators, including but not limited to the operators in the paper by Pio-Lopez et al. 2020 entitled: "*MultiVERSE: a multiplex and multiplex-heterogeneous network embedding approach*".

Other references include the paper mentioned above entitled "*Node Embedding over Temporal Graphs*" by Singer, Guy and Radinsky (2019), which denotes a way to include a temporal feature into the L_task function, thus providing a formalization of L_task for link prediction in temporal space:

$$L_{task} = - \sum_{v_1, v_2 \in V} \log Pr((v_1, v_2) \in E_t | g(f_T(v_1), f_T(v_2)))$$

More implementation on $L_{Task}$, $X^v$, $f_t(v)$, and $\sigma$ could be modified for different KPIs to be embedded.

In runtime, a set of expert-decided thresholds will be given on the product of $f(v_i)-f(v_j)$, deciding if $E_{N,t,(i,j)}$ is a positive edge $E_{N,t,(i,j)}^+$, negative edge $E_{N,t,(i,j)}^-$, or should not be any connecting edge Phase 3 Link Impact Prediction
  Input: Vertices embedding $X^{v_i} \in \mathbb{R}^{T \times d}$, vertices embedding function $f_T(v)$, impact time window T
  Output: Neighboring Vertices embedding $X^{v_j} \in \mathbb{R}^{T \times d}$, Based on the vertices embedding changing, by tuning of the other vertices, within the graph representation, one can also estimate the impact extent (strength of the link), beyond barely plus and minus of the impact identity, in a certain time window. In Phase 2, we have predicted the positive/negative of an KPI tuning's effect to another vertices. To better describe the changing of embedding representation. A link prediction model could be used for predicting the impact.

An example of a suitable link prediction model may be found, for example, in the paper by Tran P. V. entitled, "*Learning to make predictions on graphs with autoencoders*" 2018 IEEE 5th International Conference on Data Science and Advanced Analytics (DSAA). IEEE, 2018: 237-245.

Figure 4:
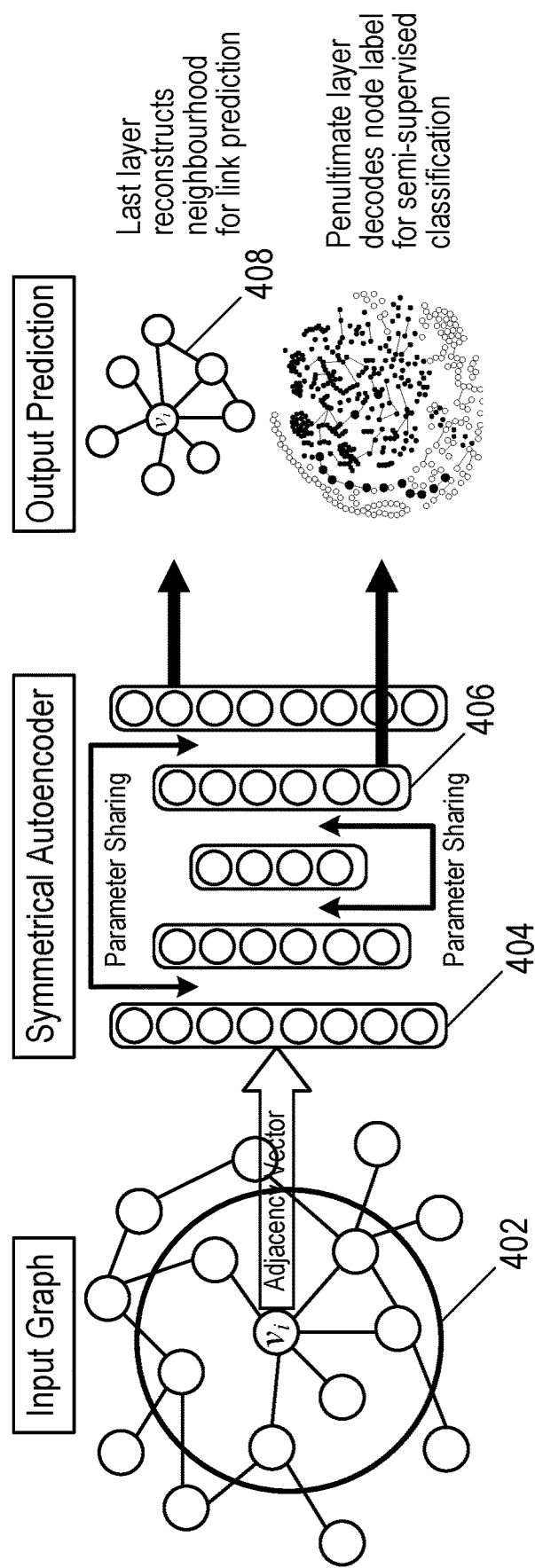
FIG. 4 illustrates the use of an auto-encoder for relationship (e.g. link) prediction according to some embodiments herein.

With reference to FIG. 4, suppose the problem is reduced to the first neighbor (neighbor with direct impart, either positive or negative, in Phase 2). Then the problem is limited into, for a selected node embedding $X^v \in \mathbb{R}^{T \times d}$, based on its tuning in time window T, perform link prediction towards its neighbors.

One possible solution is to use an autoencoder, taking $\{X^{v_i}, X^{v_j}\}$ as the training sets of the autoencoder within the Time window T, where the link is stationary and time-invariant by the KPI vertex selected. One can train a model to learn its neighbor's representation knowing the selected vertex's representation.

Different types and architectures of autoencoder may be used for such a purpose. One feasible training framework is a local Neighborhood graph autoencoder (LoNGAE) (as illustrated in FIG. 4). LoNGAE comprises 2 components: an encoder (The first two layers 404 in FIG. 4; a 2 layered fully connected neural net), and decoder (the last two layers in FIG. 4 406; similar in structure to the encoder) training with different active function.

In the encoder part, we have the input 402: the embedding of selected node $X^{v_i}$ and its neighboring embedding $X^{v_j}$, the delta of embedding during time window t for both $\mathbb{R}^{T \times d}$ is extracted, as $X^{v_i}_t$, $X^{v_j}_t$ $$z_i = g(X^{v_i}_t) = ReLU(W*ReLU(V\,X^{v_i}_t + b^{(1)}) + b^{(2)})$$

In a similar way, the decoder part is shown:

$$X^{v_j}_t = f(z_i) = V^T*ReLU(W^T z_i + b^{(3)}) + b^{(4)}$$

In short, the autoencoder attempts to simulate (and provide as output 408) the impact from $X^{v_i}_t$ to $X^{v_j}_t$. Also, in the graph, the neighbor's neighbor could go back to the selected point, thus the training iteration to optimize the parameters target on:

$$\widehat{X^{v_i}}_t = h(X^{v_i}_t) = f(g(X^{v_j}_t)) = f(g(f(g(X^{v_i}_t))))$$

Phase 4, Numerical Strength Prediction
  Framework: Supervised Learning
  Model: logistic regression (LR) [12]/Fully Connect Network (FCN)
  Input: Linked Graph dataset $G(V_{N,t}, E_{N,t})$ (output of Phase 2) Neighboring Vertices changing delta$_{Neighbor}$, with the tuning KPI: tuning KPI representing Vertices tuning delta delta$_{Turn}$, on certain timeslot t within the impact time window T(from Phase 3).
  Output: Predicted Strength Value In Phase 3 an autoencoder is used to estimate which neighboring vertices could be affected by tuning certain KPI. To provide a numerical estimation/prediction of such impact, one could simulate such impact with neuron architecture, using LR or FCN. And consider the training weight of a mature model weight of each input to be the numerical strength of each connecting edge in the graph.

Due to the known bi-directional properties of the relation between KPIs (Since we do not differ the internal causality between 2 vertices in this graph, like in FIG. 2). We could consider, as mentioned above, the process of tuning of one KPI affecting its neighbors, to be similar to a process of tuning its neighboring KPI having an impact to the targeting KPI, through the numerical strength.

Here we provide one implementation of LR as an example: Having the output of Phase 2, it is possible to set the input parameter of the LR model, to be the ones with direct link to the interested KPI vertices. And, taking the output of phase 3, we can see in time window T, such link (from neighboring KPI to the particular KPI (e.g. the KPI of interest) will be stable.

Figure 5:
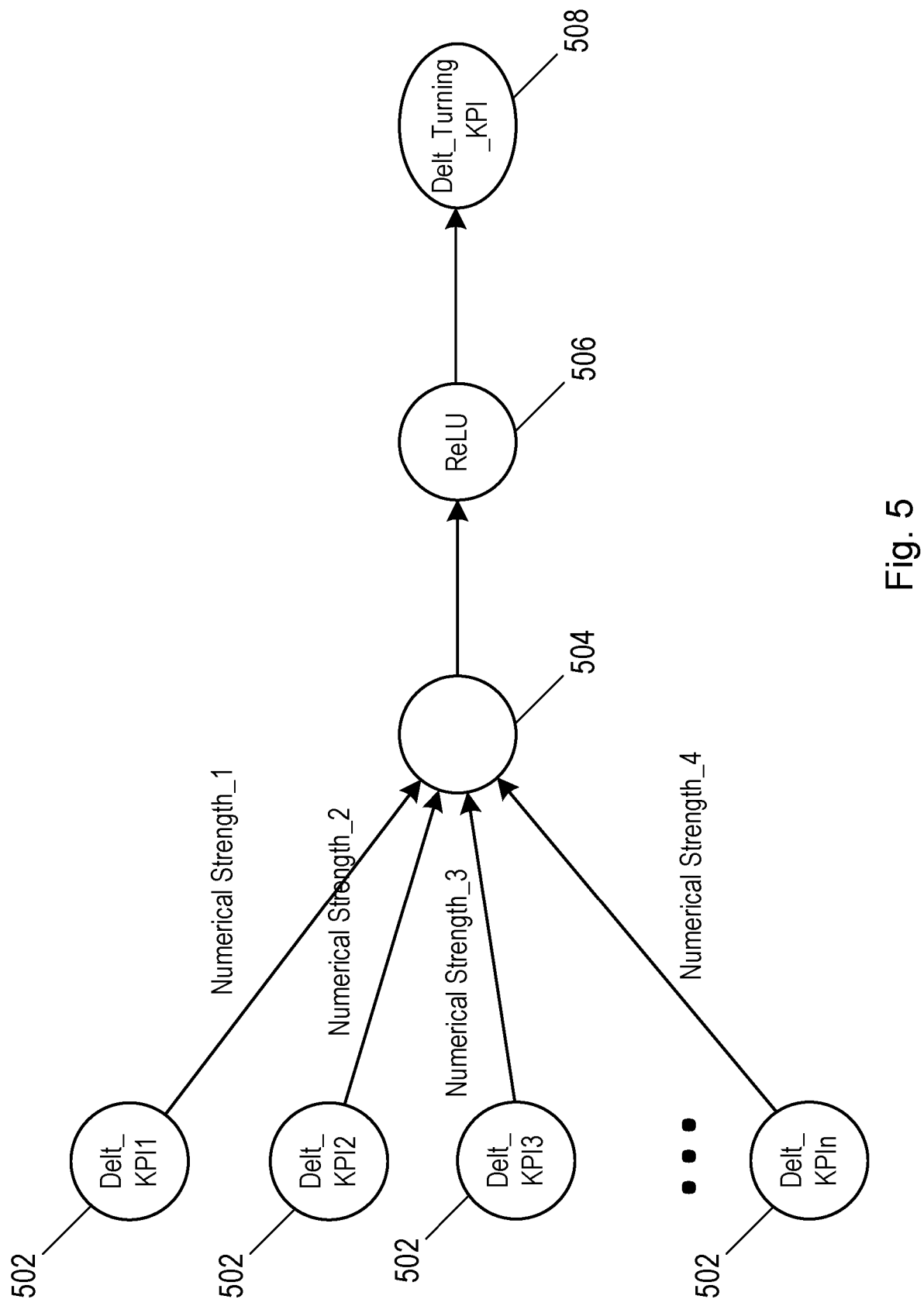
FIG. 5 illustrates a manner in which to simulate the numerical impact on neighboring KPIs using a logistic regression model.

Thus, knowing a set of Neighboring KPI will have stable and direct impact towards KPI of interest, one can produce a dataset {Delta_KPI$_1$, Delta_KPI$_2$ ... Delta_KPI$_n$|Delta_Turning_KPI}, where Delta_KPI$_n$ is the affecting neighbors delta in time of interest slot t and Delta_Turning_KPI is the KPI of interest delta value (input parameters 502 in FIG. 5). These may be input into a logistic regression computation 504. In FIG. 5 the circle 504 indicates a powered summation of the inputs with added constant (the powers are the "weights" 502, indicated as the 'Numerical strengths' connecting each input 502 to 504). In iterative training, the values of the numerical strengths and the constant will be determined. The output of the logistic regression computation may be input to a ReLU model 506 to output the effect of tuning one KPI on its neighbors.

With adequate training samples, one could produce a converged model, as illustrated in FIG. 5, and the weight for each input parameter contributing to the resulting KPI is the numerical strength. And this would be insert on each connecting edge (as in FIG. 3) to indicate the numerical strength contribution. Through this model, human expert would have an estimation on the numerical impact of tuning/changing one KPI towards its neighbors.

In some embodiments, the method may further comprise repeating the step of training the model to predict the relationships between the KPIs, based on a further training dataset. Generally, the model may be trained each time the method is performed. For example, in the detailed embodiment above, the phases 1-4 may be repeated, for example, when a new BI is applied to the communications network (e.g. that may result in new conflicts). In other embodiments, the method 200 may be performed at regular time intervals, so as to address any KPI target conflicts that may arise due to the time varying nature of the communications network.

Once the relationships have been determined, the method moves on to step 206 whereby one or more conflicts are determined between the KPI targets, using the determined relationships.

Conflicts may generally be determined using techniques from branches of mathematics that can be used to analyse inconsistencies.

For example, conflicts may be determined by framing the relationships in terms of a constraint satisfaction problem. The skilled person will be familiar with constraint satisfaction problems, but in brief, constraint satisfaction problems are defined in terms of a set of variables, that should each satisfy a number of constraints or limitations. Constraint satisfaction problems can be solved using constraint satisfaction methods. A solution may comprise a set of values for the variables that satisfy all of the constraints. Values that satisfy the constraints are said to lie in the "feasible region".

Herein, a constraint satisfaction problem may be compiled based on input data comprising:
1. The relationships determined in step 204 (e.g. the predicted positive or negative links together with their strengths)
   a. positive means increasing (decreasing) KPI1 results in increasing (decreasing) KPI2
   b. negative means increasing (decreasing) KPI1 results in decreasing (increasing) KPI2
   c. Strength is a quantitative parameter indicating the confidence in the relationship (link)
2. The KPI targets, which, for example may be defined as KPI value ranges, e.g. the acceptable and desired value intervals of KPIs and any constraints or relationships defined by the BIs (or Service Leven Agreements—e.g. Coverage can never be less than and the SLA insists that it is no greater than some threshold T). Such information is readily available from the Operations Support System (OSS).
3. KPIs targets This information is then used to define constraints. For example, in some embodiments, the method may comprise modeling a constraint satisfaction problem, by introducing variables for each of the KPIs and relating them through numeric (in) equalities and symbolic constraints using polarity and strength of the determined relationships (e.g. links) and KPI value intervals. Defining a constraint satisfaction problem can be a fully automated process.

Example

Assuming KPI1 and KPI2 to be a cooperative KPI pair. This relationship can be modeled as a linear equality of the form KPI1=2*KPI2, indicating an increase of a factor of 2 (the strength of the link between the two KPIs) on KPI1 whenever KPI2 increase by 1.
Assuming both KPIs range over positive integers, two inequalities arise:
  KPI1>0
  KPI2>0.
Assuming KPI2 (e.g. Congestion) has to be below some T, we also have:
  KPI2<T.
Mutually unsatisfiable KPI targets (or their value sub-intervals) amount to conflicts.

The constraint satisfaction problem is solved (or attempted to be solved) using constraint programming techniques. If and when a set of constraints is unsatisfiable, this indicates a conflict among the KPI targets. Sets of mutually compatible and/or incompatible KPI targets may thus be produced.

In other words, step 206 of the method 200 may comprise using the relationships to determine a constraint satisfaction problem, and determining the one or more conflicts based on constraints in the constraint satisfaction problem that are unsatisfiable (e.g. cannot be solved). Step 206 may further comprise determining, from the constraint satisfaction problem, one or more KPI targets that are mutually compatible based on constraints in the constraint satisfaction problem that are satisfiable (e.g. can be solved).

If conflicts are determined, the method may further comprise proposing changes to the KPI targets that resolve the one or more conflicts, using a constraint programming method.

The changes may comprise relaxations of particular KPIs that would allow for better collective satisfaction. This may be performed in many ways, for example, by using optimisation techniques to determine optimal (e.g. minimally conflicting) or feasible values of KPIs. Identifying conflicts and relaxations are two tasks studied in different areas of computer science and more in particular in AI, see, for example, the paper by Raymond Reiter: "A Theory of Diagnosis from First Principles" Artif. Intell. 32(1): 57-95 (1987); and the paper by Anton Belov, Inês Lynce, João Marques-Silva: "*Towards efficient MUS extraction*". AI Commun. 25(2): 97-116 (2012).

Finding relaxation may be performed using a linear search approach, while for conflicts the so-called destructive approach can be used. For an example of those techniques applied in the context of propositional logic an interested reader can look at the papers by Reiter and Belov cited above. The constraints considered in these papers are an example of the more general case of a constraint satisfaction problem (see João Marques-Silva, Federico Heras, Mikolás Janota, Alessandro Previti, Anton Belov: On Computing Minimal Correction Subsets. IJCAI 2013: 615-622).

Concrete feasible values of KPI targets may be computed wherein the set of KPIs to relax are set to be as close as possible to the values specified by the BIs.
An example using a set of linear constraints on the domain of integers may be as follows:
  A. KPI1=2*KPI2 (discovered using a Directional temporal graph)
  B. KPI1<=4 (imposed by the SLA, coming from the OSS)
  C. KPI3=5 (coming from a BI)
  D. KPI2=3 (coming from a BI)
  E. KPI3>KPI2 (coming from the OSS)

The above set of constraints has no solution, since KPI1=6 due to the equality "A" and the value assigned in "D" to KPI2. However, equality "B" imposes a value for KPI1 that has to be less than 4. Notice that constraints "C" and "E" are irrelevant for the inconsistency, since constraints "A", "B" and "D" on themselves collectively comprise the culprit. "A", "B" and "D" is thus a set of mutually incompatible constraints. A relaxation would be either to remove "D" or suggest changing it into KPI2=2, which both make the set of constraints feasible again. It is noted that this is merely an example and that in a real communications network, there may be a very large number of constraints to be satisfied.

Using the techniques above, the method 200 may thus further comprise proposing changes to the KPI targets that resolve the one or more conflicts, using a constraint programming method. The method 200 may further comprise updating the KPI targets based on the proposed changes, and applying the updated KPI targets to the communications network. In this way a set of compatible (e.g. mutually satisfiable) KPI targets may be set in a communications network.

Figure 6:
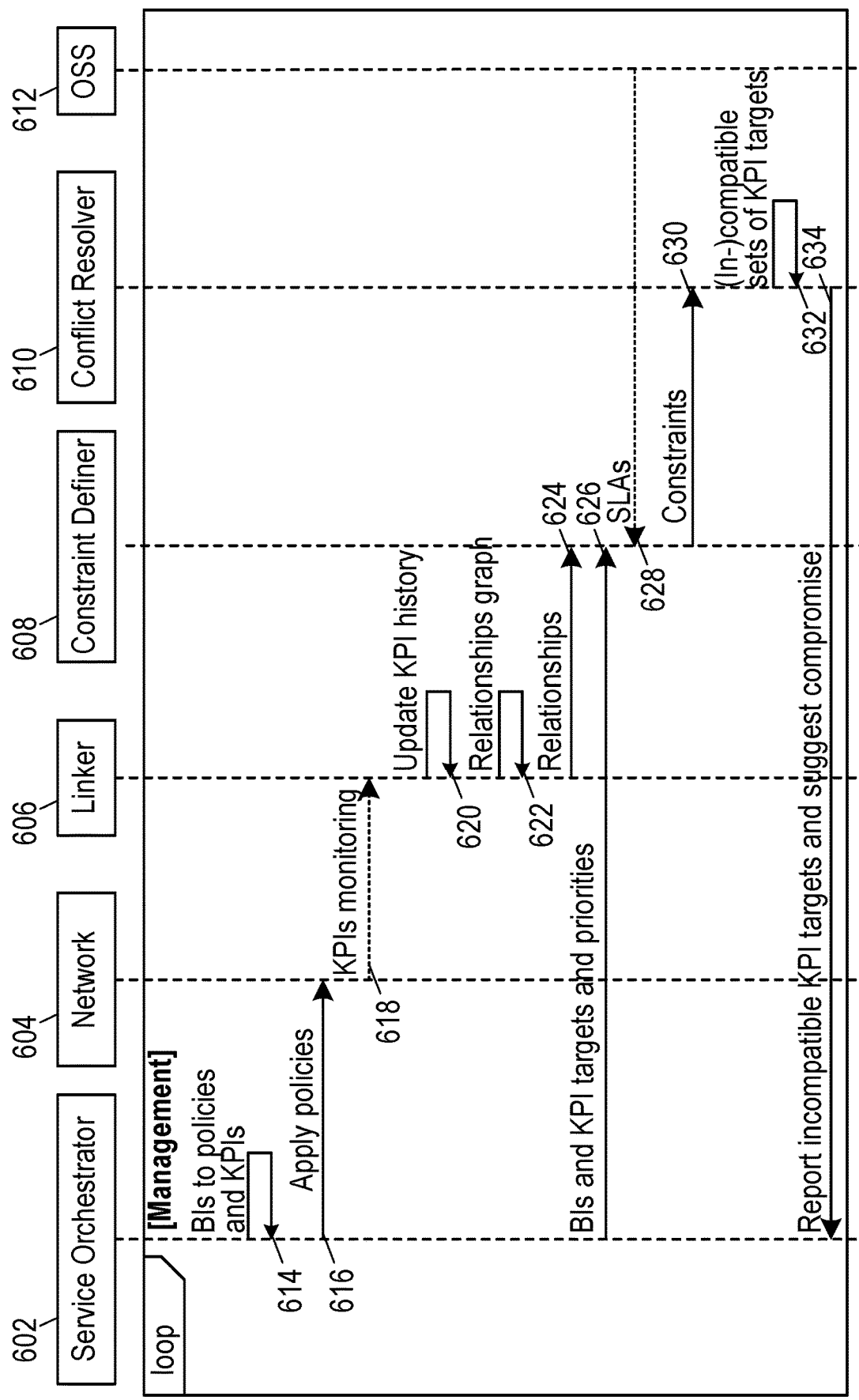
FIG. 6 illustrates a sequence diagram illustrating a method according to an embodiment herein.

Turning now to FIG. 6. which illustrates a sequence diagram illustrating a method according to an embodiment herein. In this embodiment, a Service Orchestrator (SO) 602 receives BIs and in a step 614 processes (e.g. maps) them into policies and KPI targets and priorities that are applied 616 to the communications network 604.

A Linker module 606 (a new logical entity), performs step 202 described above and obtains KPI targets for a plurality of KPIs in the communications network from the SO and monitors 618 the experienced KPIs at the communications network 604 to form a training dataset of KPIs and example relationships between the KPIs. The Linker updates the KPI history 620 and uses the training data set (e.g. the old and the new relationships among KPIs) to construct a relationship graph 622 for knowledge representation and complete description of the known relationships among KPIs. It analyses the data and determines new relationships among the KPIs using directional temporal graph link prediction. This was described with respect to step 204 above and the detail therein will be understood to apply equally to the functionality of the Linker module 606. The relationships are then sent 624 to a constraint definer module 608.

The Constraint Definer 608 module (a new logical entity), receives the determined relationships among the KPIs and also receives 626 BIs and KPI targets and priorities and constraints from SLAs 628. The Constraint Definer 608 defines constraints over KPIs (e.g. forms a constraint satisfaction problem) and sends the constraints 630 to a Conflict Resolver module 610.

The Conflict Resolver module 610 (a new logical entity), receives 630 the constraints from the Constraint Definer module 608 and attempts to solve 632 the constraint satisfaction problem to determine (e.g. according to step 206 above) one or more conflicts between the KPI targets, using the relationships. The Conflict Resolver module 610 may determine resolutions to any determined conflicts (e.g. new KPI targets) using constraint programming, as described above with respect to step 206. The Conflict Resolver 610 then reports 634 the KPI conflicts to the Service Orchestrator 602 together with the determined options for relaxing the KPIs (e.g. the determined resolutions to the conflicts). This allows for modifications of the BI-to-KPI mapping by the Service Orchestrator 602.

In UML, this may be expressed as:

```
@startuml
participant "Service Orchestrator" as Mapper
participant "Network" as Data
participant Linker
participant "Constraint Definer" as Definer
participant "Conflict Resolver" as Resolver
loop Management
Mapper -> Mapper: BIs to policies\nand KPIs
Mapper -> Data: Apply policies
Data --> Linker: KPIs monitoring
Linker -> Linker: Update KPI history
Linker -> Linker: Relationships graph
Linker -> Definer: Relationships
Mapper -> Definer: BIs and KPIs targets and priorities
OSS --> Definer: SLAs
Definer -> Resolver: Constraints
Resolver -> Resolver: (In-)compatible\nsets of KPIs
Resolver -> Mapper: Report incompatible KPIs and suggest compromise
end
@enduml
```

Turning now to another embodiment, there is a computer program comprising instructions which, when executed on at least one processor, cause the at least one processor to carry out a method according to any of the embodiments described herein.

According to another embodiment, there is a carrier containing a computer program as described above, wherein the carrier comprises one of an electronic signal, optical signal, radio signal or computer readable storage medium.

According to another embodiment there is a computer program product comprising non transitory computer readable media having stored thereon a computer program as described above.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at runtime. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method performed by a node in a communications network, the method comprising:
obtaining Key Performance Indicator, KPI, targets for a plurality of KPIs in the communications network;
determining relationships between the KPIs using a model trained using a graph-based machine learning process, wherein each relationship describes a manner in which changing a network configuration to alter a first one of the plurality of KPIs affects a second one of the plurality of KPIs; and
determining one or more conflicts between the KPI targets, using the relationships.

2. The method as in claim 1 wherein the model comprises a Directional Temporal Graph.

3. The method as in claim 2 further comprising:
obtaining a training dataset comprising example relationships between the KPIs; and
training the model to predict other relationships between the KPIs, based on the obtained training dataset.

4. The method as in claim 3 wherein the KPIs are used as vertices and the example relationships between the KPIs are used as example edges in the graph-based machine learning process.

5. The method as in claim 4 wherein the step of training the model to predict new relationships between the KPIs, based on the obtained training dataset comprises:
determining an embedding and an embedding function for the vertices in the training dataset, using the graph-based machine learning process.

6. The method as in claim 5 wherein the relationships are determined based on weights associated with edges in the embedding and the embedding function.

7. The method as in claim 3 wherein the training dataset further comprises temporal information and the relationships are time dependent.

8. The method as in claim 7 wherein the graph-based machine learning process comprises a process of building node and/or vertex embeddings for a temporal graph.

9. The method as in claim 5 further comprising:
using an autoencoder to determine a subset of edges from the embedding and the embedding function.

10. The method as in claim 9 wherein the subset of edges comprise edges connecting vertices that can be mutually expressed by neighboring embeddings through a converged model, for longer than a threshold duration of time.

11. The method as in claim 9 further comprising:
providing the output of the autoencoder and the embedding function to a second model;
training the second model, based on the determined embedding function and the output of the autoencoder, to take as input a time window and a change in a particular KPI, and output a prediction of the relationships between the particular KPI and other KPIs of the plurality of KPIs that are affected by the change in the particular KPI; and
using the second model to predict the relationships.

12. The method as in claim 11 wherein the second model comprises a Logistic Regression, LR, model or a Fully Connected Network, FCN.

13. The method as in claim 3 further comprising:
repeating the step of training the model to predict the relationships between the KPIs, based on a further training dataset.

14. The method as in claim 1 wherein the step of determining one or more conflicts comprises:
using the relationships to determine a constraint satisfaction problem; and
determining the one or more conflicts based on constraints in the constraint satisfaction problem that are unsatisfiable.

15. The method as in claim 14 further comprising:
determining, from the constraint satisfaction problem, one or more KPI targets that are mutually compatible based on constraints in the constraint satisfaction problem that are satisfiable.

16. The method as in claim 14 further comprising:
proposing changes to the KPI targets that resolve the one or more conflicts, using a constraint programming method.

17. The method as in claim 16 further comprising:
updating the KPI targets based on the proposed changes; and
applying the updated KPI targets to the communications network.

18. The method as in claim 1 wherein each relationship comprises an indication of whether changing the network configuration so as to increase the first one of the plurality of KPIs has the effect of increasing or decreasing the second one of the plurality of KPIs; and
a quantification of an amount by which changing the first one of the plurality of KPIs changes the second one of the plurality of KPIs.

19. The method as in claim 1 wherein the step of obtaining Key Performance Indicator, KPI, targets for a plurality of KPIs, in the communications network comprises:
determining the KPI targets from one or more Business Intents, BIs.

20. A node in a communications network, the node comprising:
a memory comprising instruction data representing a set of instructions; and
a processor configured to communicate with the memory and to execute the set of instructions, wherein the set of instructions, when executed by the processor, cause the processor to:
obtain Key Performance Indicator, KPI, targets for a plurality of KPIs, in the communications network;
determine relationships between the KPIs using a model trained using a graph-based machine learning process, wherein each relationship describes a manner in which changing a network configuration to alter a first one of the KPIs affects a second one of the KPIs; and
determine one or more conflicts between the KPI targets, using the relationships.

* * * * *